US009176869B2

(12) United States Patent
Bobroff et al.

(10) Patent No.: US 9,176,869 B2
(45) Date of Patent: Nov. 3, 2015

(54) MEMORY USE FOR GARBAGE COLLECTED COMPUTER ENVIRONMENTS (71) Applicant: International Business Machines Corporation, Armonk, NY (US)

(72) Inventors: Norman Bobroff, Katonah, NY (US); Arun Iyengar, Yorktown Heights, NY (US); Peter Westerink, Ossining, NY (US)

(73) Assignee: GLOBALFOUNDRIES INC, Grand Cayman (KY)

( * ) Notice: Subject to any disclaimer, the term of this patent is extended or adjusted under 35 U.S.C. 154(b) by 286 days.

(21) Appl. No.: 13/945,494

(22) Filed: Jul. 18, 2013

(65) Prior Publication Data
US 2015/0026428 A1    Jan. 22, 2015

(51) Int. Cl.
*G06F 12/02*    (2006.01)
(52) U.S. Cl.
CPC ...... *G06F 12/0253* (2013.01); *G06F 2212/702* (2013.01)
(58) Field of Classification Search
CPC ............ G06F 12/0253; G06F 12/0261; G06F 12/0269; G06F 12/0276; G06F 2212/702; G06F 9/5016
See application file for complete search history.

(56) References Cited

U.S. PATENT DOCUMENTS

| | | | | |
|---|---|---|---|---|
| 8,583,783 | B1 * | 11/2013 | Hayward et al. | 709/224 |
| 2009/0112952 | A1 * | 4/2009 | Adams et al. | 707/206 |
| 2012/0324199 | A1 * | 12/2012 | Yamashita et al. | 711/170 |
| 2013/0325912 | A1 * | 12/2013 | Corrie | 707/813 |
| 2014/0143516 | A1 * | 5/2014 | Dawson et al. | 711/171 |
| 2014/0324924 | A1 * | 10/2014 | Ahad et al. | 707/813 |

OTHER PUBLICATIONS

IBM "AIX Extra: Using Dynamic LPAR in AIX 5L v5.2." IBM Systems Magazine, Apr. 2004.
WikiPedia "Dynamic Logical Partitioning" Paril 04, 2013.

* cited by examiner

*Primary Examiner* — Michael Krofcheck
(74) *Attorney, Agent, or Firm* — Fleit Gibbons Gutman Bongini & Bianco PL; Jon A. Gibbons (57) ABSTRACT A method, processing system, and computer readable storage medium, reduce heap memory used by an application, where unused memory in the heap memory is reclaimed by a garbage collector. A processor periodically monitors the application's memory usage including maximum heap memory size, committed heap memory size, in use heap memory size, and a garbage collection activity level. The processor, based on determining that the monitored garbage collection activity level is below a threshold, releases unused heap memory from the application by reducing the maximum heap memory size.

22 Claims, 3 Drawing Sheets

MEMORY USE FOR GARBAGE COLLECTED COMPUTER ENVIRONMENTS

CROSS-REFERENCE TO RELATED APPLICATION

This application is related to U.S. patent application Ser. No. 13/945,516, entitled "OPTIMIZING MEMORY USAGE ACROSS MULTIPLE GARBAGE COLLECTED COMPUTER ENVIRONMENTS", filed on the same filing date hereof, the disclosure of which is hereby incorporated by reference in its entirety.

FIELD OF THE DISCLOSURE

The present disclosure generally relates to computer memory management, and more particularly relates to managing use of computer memory by one or more applications in a garbage-collected information processing system.

BACKGROUND OF THE DISCLOSURE

Memory management is a process of managing computer memory, including mechanisms to dynamically allocate portions of memory to programs upon request and freeing the portions of memory for reuse when no longer needed.

Programming languages such as Java, C++, Lisp, Smalltalk, and several scripting languages allocate memory from such an area known as the heap (or heap memory). At any given time, some parts of the heap may be in use while parts may be "free" (i.e., unused) and thus available for future allocations. In order to free memory from the heap, garbage collection is needed. A key problem with such environments is that memory overhead is a significant factor. Programmers cannot manually allocate or deallocate memory objects. They need to rely on garbage collectors (i.e., one or more garbage collectors are normally available in the operating system) to free up memory which is no longer being used. In many cases, this can result in excess memory being allocated to the heap.

Such excess heap memory being allocated to one or more applications operating in a computer system environment can create serious memory management problems for the computer system. These problems are particularly difficult to deal with in situations in which multiple applications are running on the same computer system, and the applications are all competing for memory. For example, one or more Java virtual machines (JVM) might be running on an information processing system (computer system) with other applications, and the objective is to allocate memory efficiently across all applications, including the Java virtual machines. The JVM should not take up more memory than it needs. Java allocates memory from an area known as the heap. In order to free memory from the heap, garbage collection is needed.

A key problem is that while garbage collection might free up a considerable amount of memory, the JVM might not give up the free memory to the operating system. Instead, the JVM might keep the free memory for itself in case the memory requirements for the JVM increase.

Garbage collection is a form of automatic memory management that attempts to reclaim "garbage", as referring to memory occupied by objects that are no longer in use by a program. Garbage collection is often portrayed as the opposite of manual memory management, a mechanism in which the programmer specifies which objects to deallocate and return to the memory system. Many computer languages, such as Java, C++, and several scripting languages, require garbage collection either as part of the language specification or effectively for practical implementation, while other languages, such as C, C++, were designed for use with manual memory management but have garbage collected implementations available. Still others, such as Ada, Modula-3, and C++/CLI allow both garbage collection and manual memory management to co-exist in the same application by using separate heaps, and others, such as D, are garbage collected while allowing the user to manually delete objects and disable garbage collection when speed is required.

The entity that performs garbage collection is known as the garbage collector. Garbage collectors are typically implemented in software running on a computer system. They can also be implemented using special hardware that supports the garbage collector software to aid garbage collection.

In certain information processing systems, a user can manually force a JVM to give up memory (i.e., back to the operating system) that was freed during a garbage collection by adjusting a parameter known as softmx. By adjusting the value of system parameter softmx, a JVM can be forced to give up memory which has been freed by a garbage collector back to the operating system for other applications to use. A problem with this technology is that the user has to manually adjust the value of the parameter softmx to determine the right value for it so that the JVM gives memory back to the operating system. Determining the right amount of memory to give back is difficult. If too little is given back, the system will use up excess memory. If too much memory is given back, then excess CPU (processor) cycles may be consumed for giving back the memory as well as requesting additional memory later. Garbage collection overhead may also rise. In the worst case, the JVM may crash due to an out of memory error.

SUMMARY OF THE DISCLOSURE

According to one embodiment, a method for managing computer memory is disclosed. In a processing system including an application, a run-time system, and a heap memory used by the application, wherein unused memory in the heap memory is reclaimed by a garbage collector, the method reduces memory used by the application by performing operations comprising: periodically monitoring, with the processing system, run-time performance information related to the application's memory usage including a maximum heap memory size, a committed heap memory size, an in use heap memory size, and a garbage collection activity level; based on determining, with the processing system, that the monitored garbage collection activity level is below a first threshold, estimating an amount of memory that can be released from the application by reducing the maximum heap memory size; and based on determining that the estimated amount of memory that can be released from the application is above a second threshold and that the monitored garbage collection activity level is below the first threshold, reducing the maximum heap memory size to a value lower than the monitored committed heap memory size, but not lower than the monitored in use heap memory size, and thereby releasing memory from the application.

According another embodiment, and information processing system comprises: a memory; a processor communicatively coupled to the memory; a garbage collector communicatively coupled to the processor and the memory; a system monitor communicatively coupled to the processor and the memory; a memory optimizer communicatively coupled to the processor and the memory, wherein an application running on the information processing system includes a run-time system and a heap memory portion of the memory, wherein unused memory in the heap memory is reclaimed by the garbage collector, and further wherein the system monitor monitors run-time performance information for the run-time system and the heap memory and maintains memory usage parameters for the application including a maximum heap memory size, a committed heap memory size, and an in use heap memory size, and wherein the processor, responsive to executing computer instructions, performs operations comprising: maintaining, with the system monitor, memory usage parameters for the application including a maximum heap memory size, a committed heap memory size, and an in use heap memory size; reducing, with the memory optimizer, the maximum heap memory size to a value lower than the committed heap memory size but not lower than the in use heap memory size; performing, with the garbage collector, a compacting garbage collection on the heap memory to instantiate the reduced value of maximum heap memory size; and increasing, with the memory optimizer, the maximum heap memory size to allow the application to allocate more heap memory.

According to another embodiment, a computer readable storage medium comprises computer instructions which, responsive to being executed by a processor, the processor being in an information processing system comprised of at least one application including a run-time system and a heap memory wherein unused memory in the heap memory is reclaimed by a garbage collector, the computer instructions cause the processor to perform operations comprising: periodically monitoring the application for memory usage including a maximum heap memory size, a committed heap memory size, an in use heap memory size, and a garbage collection activity level; and in response to the garbage collection activity level falling below a threshold value, attempting to release memory from the application by reducing the maximum heap memory size to a value lower than the committed heap memory size but not lower than the in use heap memory size.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, various detailed embodiments are disclosed herein; however, it is to be understood that the various disclosed embodiments are merely examples, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of embodiments of the disclosure.

According to various embodiments of the present disclosure, a memory optimizer in a computer system can automatically force a run-time system such as a Java virtual machine (JVM) to give up memory freed during garbage collections to the operating system, such as for other applications to use. While various embodiments of the present disclosure are described in terms of using Java applications and a JVM, the new and novel approach to memory management can be applied to many different types of run-time systems and to programming languages, such as Java, which use heap storage and garbage collection such as C++, Lisp, Smalltalk, and various scripting languages.

Various embodiments of the present disclosure are applicable to languages with automatic memory management and garbage collection, such as Java, Lisp, Smalltalk, C++, many scripting languages, etc. Certain embodiments of the present disclosure are applicable to languages which use garbage collection in general. For ease of exposition, various embodiments of the present disclosure will be discussed in terms of Java applications and Java virtual machines (JVM run-time systems). One of ordinary skill in the art will be able to easily apply such discussed various embodiments of the present disclosure to other languages and other run-time systems, that operate with garbage collection.

According to one example embodiment, an information processing system (or computer system) comprises one or more JVMs running on the same operating system. A system monitor in the computer system continuously monitors each JVM for run-time performance information including, but not limited to, CPU usage, memory usage, and heap usage. The system monitor in the computer system, according to the present example, maintains the following memory usage parameters:

softmx: the maximum size the heap is allowed to grow to. Softmx is also known as the maximum heap size;

committed: the amount of heap memory that has been committed by the operating system to the JVM; and inuse: the amount of heap memory in use, e.g., the amount of heap memory that the JVM is actually using.

During normal execution (i.e., not during garbage collection), the value of the parameter inuse will either rise as more heap memory is needed for an application or stay the same. Programmers cannot explicitly deallocate heap memory; however, the value of the parameter inuse can decrease as a result of garbage collection.

After a garbage collection operation by a garbage collector, committed heap memory by default will not go down, even if the garbage collector frees a considerable amount of heap storage. This means that the JVM will often maintain excess free heap storage for itself which could be returned to the operating system such as to be used by other applications.

In order to return free heap memory to the operating system, for example, the following process can be performed by the memory optimizer in the computer system:

The value of the parameter softmx is to be lowered to a value less than the value of the parameter committed. However, the value of the parameter softmx cannot be lowered to a value less than the value of the parameter inuse.

After the value of the parameter softmx has been lowered, a compacting garbage collection, as will be discussed in more detail below, takes place to force the JVM to release committed memory which is not being used. If the new value of softmx is still at least as large as the value of the parameter inuse at the time of the compacting garbage collection, then the value of the parameter committed is reduced to the new value of the parameter softmx, and an amount of memory equal to the difference of the old value of committed and the new value of committed is returned back to the operating system. The operating system can then use the returned free memory or allocate it to any application running on the operating system.

Some garbage collections compact memory, which frees up large blocks of contiguous memory. Other garbage collections do not compact memory. While it is advantageous to compact memory, the drawback is that compaction involves overhead. There is less overhead to performing a garbage collection without compacting memory as compared with performing a garbage collection which compacts memory. Thus, when garbage collection is invoked, memory might be compacted during some of the invocations. For other invocations, memory might not be compacted. A garbage collection which compacts memory is referred to as a compacting garbage collection.

One key difficulty is how to automate this process discussed above. According to various embodiments of the present disclosure, as will be discussed in more detail below, a memory optimizer in the computer system tracks the frequency of garbage collections on heap memory within a JVM. When the frequency of garbage collections is high or moderate, this indicates significant heap usage. Therefore, under such conditions it is not advisable for the JVM to give up memory to the operating system. If the frequency of garbage collections is sufficiently high, it may even be desirable for the memory optimizer, or the JVM, to raise the value of the parameter softmx to allow the heap size for the JVM to grow larger.

When garbage collections activity is sufficiently low, the memory optimizer in the computer system then determines whether the JVM can release memory to the operating system. There are multiple ways in which the memory optimizer in the computer system can determine if garbage collection activity is sufficiently low, including but not limited to any one or a combination of the following:

1) Time since the last garbage collection has exceeded a threshold value;

2) Frequency of last several garbage collections. It is preferable to weight frequencies of more recent garbage collections higher than less recent ones;

3) Time, and/or other overhead metric, spent in recent garbage collections. It is preferable to weight more recent garbage collections higher than less recent ones; and 4) Normalized garbage collection overhead. For example, any of the previous metrics can be normalized by the time spent by an application in regular processing, not including garbage collection. For example, the memory optimizer in the computer system could determine if garbage collection activity is sufficiently low by dividing the frequency of garbage collections by the time spent by the application in regular processing, not including garbage collection.

The memory optimizer in the computer system can also consider garbage collections which compact heap memory (i.e. compacting garbage collections). Thus, the memory optimizer can also determine if garbage collection is sufficiently low using any one or a combination of the following metrics:

1) Time since the last compacting garbage collection has exceeded a threshold value;

2) Frequency of last several compacting garbage collections. It is preferable to weight frequencies of more recent garbage collections higher than less recent ones.

3) Time and/or other overhead metric spent in recent compacting garbage collections. It is preferable to weight more recent garbage collections higher than less recent ones; and 4) Normalized garbage collection overhead for compacting garbage collections. For example, any of the previous metrics can be normalized by the time spent by an application in regular processing, not including garbage collection. For example, the memory optimizer in the computer system could determine if garbage collection activity is sufficiently low by dividing the frequency of compacting garbage collections by the time spent by the application in regular processing, not including garbage collection.

Once the memory optimizer in the computer system determines that garbage collection activity is sufficiently low, it estimates how much heap memory could be released (e.g., returned to the operating system). If the value of the parameter committed is below a threshold value, then the heap is not consuming much memory, so there isn't much point to trying to reduce the heap size further.

If the value of the parameter committed is above the threshold value, then the memory optimizer in the computer system does further tests to see how much heap memory could be released to the operating system. The memory optimizer in the computer system has the option of requesting a garbage collector perform a compacting garbage collection to lower the value of the parameter inuse as much as possible. If the value of the parameter inuse is already low enough, this step may not be needed. If the difference between the value of the parameter inuse (in use heap memory) and the value of the parameter committed (committed heap memory) exceeds a threshold value, then it is profitable for the JVM to release heap memory to the operating system. The memory optimizer in the computer system determines a new value for the parameter committed, and stores the new value in the parameter new_committed. The value of the parameter new_committed must be lower than the value of the parameter committed but not lower than the value of the parameter inuse. In general, the value of the parameter new_committed should be higher than the value of the parameter inuse to prevent the heap size from getting too small which in the worst case could trigger an out-of-memory error.

Next, according the present example, the following three steps take place:

The value of the parameter softmx is lowered to match the value of the parameter new_committed.

A compacting garbage collection takes place. This has the effect of lowering the value of the parameter committed to the current value of the parameter softmx (which is the value of the parameter new_committed) and returning memory freed from the heap of the JVM to the operating system.

It is risky to keep the value of the parameter softmx low because it limits how much the heap can grow to. If the value of the parameter softmx is too low, an out-of-memory error can occur. Therefore, it is preferable to raise the value of the parameter softmx after the compacting garbage collection has taken place. For example, the value of the parameter softmx can be increased to its previous value.

Figure 1:
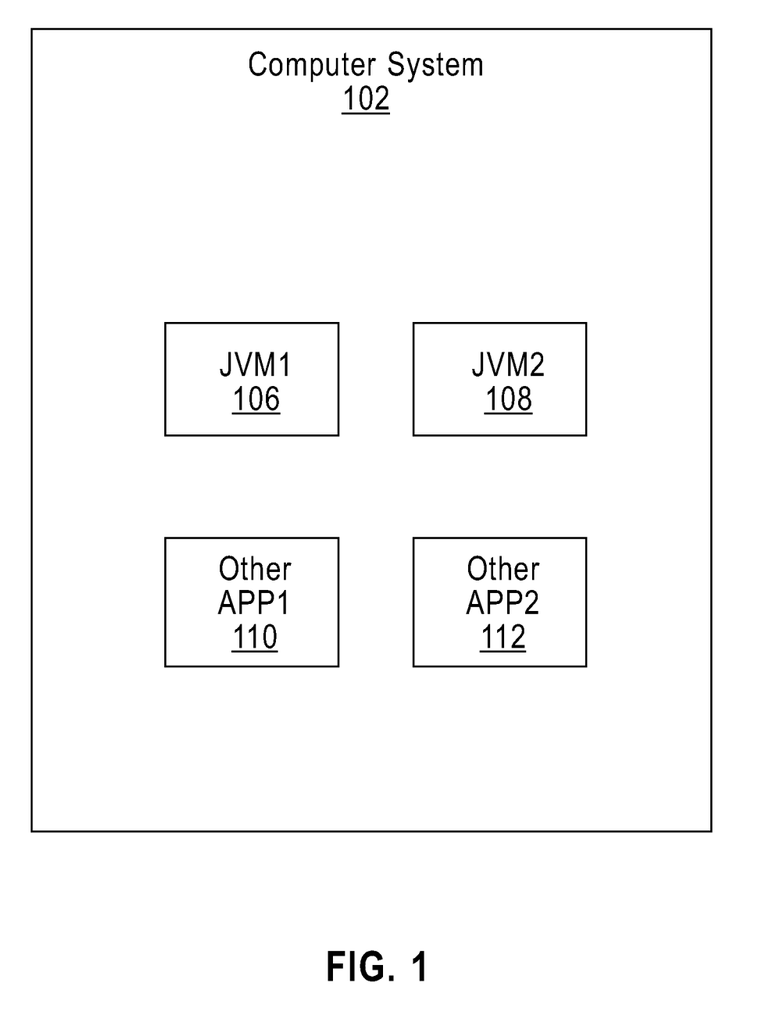
FIG. 1 is a block diagram illustrating one example of a computer system operating environment according to one embodiment of the present disclosure.

FIG. 1 illustrates an example of an information processing system (e.g., computer system) 102 running two JVMs (e.g., two run-time systems) 106, 108, and two other applications 110, 112, according to various embodiments of the present disclosure. It should be noted that the computer system 102 can utilize various embodiments of the present disclosure while running with one or more JVMs. There may also be one or more additional concurrently running applications running on the computer system 102.

Figure 2:
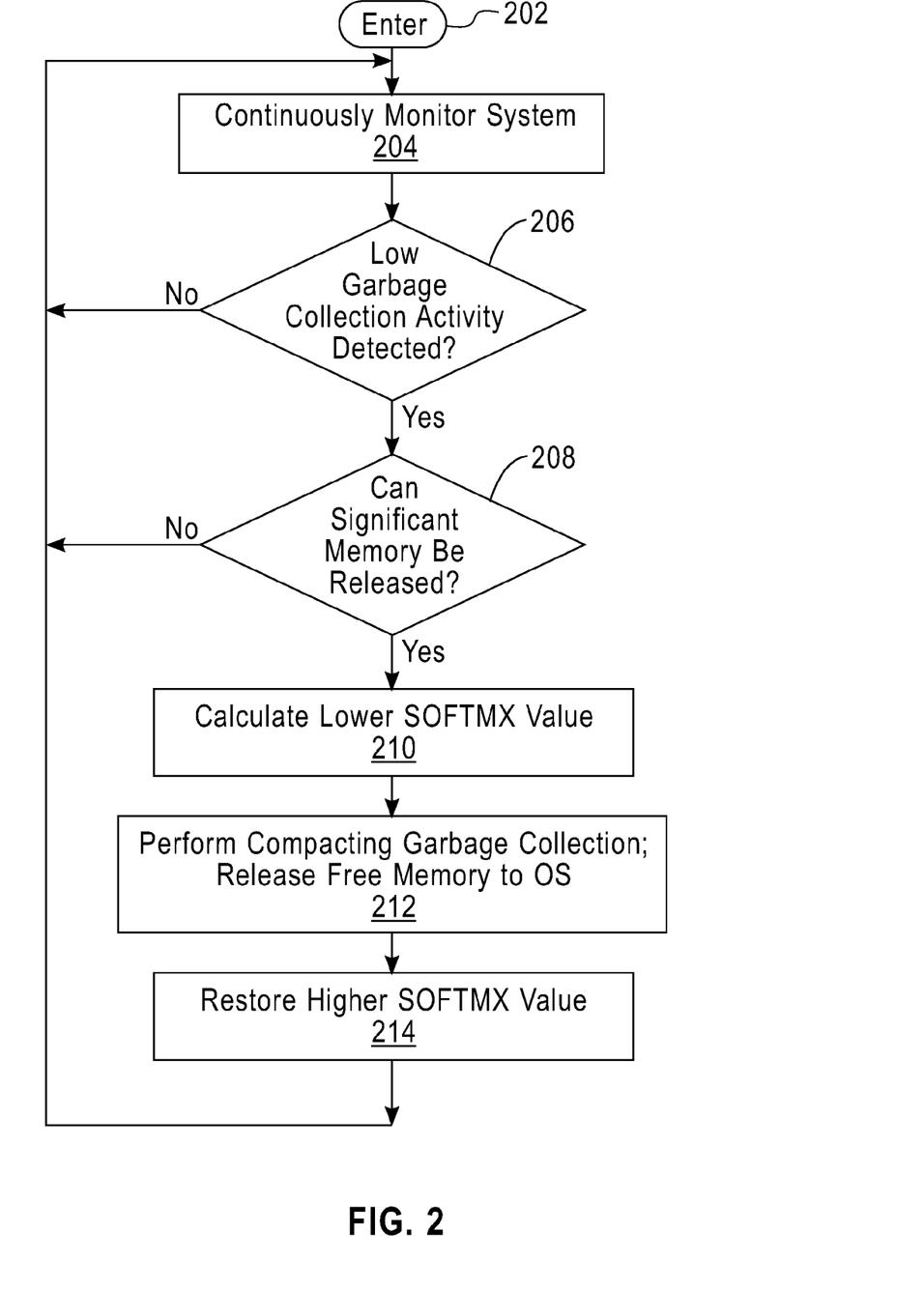
FIG. 2 is an operational flow diagram illustrating one example of a method for managing memory in a computer system.

FIG. 2 depicts an example of a method for managing memory in a computer system 102, such as the computer system 102 shown in FIG. 1, in accordance with various embodiments of the disclosure. In the present example, the computer system 102 includes a system monitor (not shown in FIG. 1) and a memory optimizer (not shown in FIG. 1), as will be discussed below. After entering the process, at step 202, a run-time system, operating with an application, is monitored with the system monitor, at step 204, for run-time performance information including CPU and memory usage, including heap usage. The system monitor continuously monitors values for parameters softmx, committed, and inuse.

The computer system 102, such as with the memory optimizer, determines whether garbage collection activity is sufficiently low. There are multiple ways in which the computer system 102 can determine if garbage collection activity is sufficiently low, including but not limited to the following:

Time since the last garbage collection has exceeded a threshold.

Frequency of last several garbage collections. It is preferable to weight frequencies of more recent garbage collections higher than less recent ones.

Time and/or other overhead metric spent in recent garbage collections. It is preferable to weight more recent garbage collections higher than less recent ones.

Normalized garbage collection overhead. For example, any of the previous metrics can be normalized by the time spent by an application in regular processing, not including garbage collection. For example, the computer system 102 could determine if garbage collection activity is sufficiently low by dividing the frequency of garbage collections by the time spent by the application in regular processing, not including garbage collection.

The computer system 102 can also consider garbage collections which compact memory (i.e. compacting garbage collections). Thus, the computer system 102 can also determine if garbage collection is sufficiently low using one or more of the following metrics:

Time since the last compacting garbage collection has exceeded a threshold.

Frequency of last several compacting garbage collections. It is preferable to weight frequencies of more recent garbage collections higher than less recent ones.

Time and/or other overhead metric spent in recent compacting garbage collections. It is preferable to weight more recent garbage collections higher than less recent ones.

Normalized garbage collection overhead for compacting garbage collections. For example, any of the previous metrics can be normalized by the time spent by an application in regular processing, not including garbage collection. For example, the computer system 102 could determine if garbage collection activity is sufficiently low by dividing the frequency of compacting garbage collections by the time spent by the application in regular processing, not including garbage collection.

Once the computer system 102 determines that garbage collection activity is sufficiently low, at step 206, the memory optimizer estimates how much heap memory could be given back to the operating system, at step 208. If the value of parameter committed is equal to or below a threshold, then the heap is not consuming much memory, so there isn't much point to trying to reduce the heap size further.

If the value of parameter committed is above the threshold, then the computer system 102 determines how much heap memory could be returned to the operating system. The computer system 102 has the option of performing a compacting garbage collection to lower the value of parameter inuse. If inuse is already low enough, this step may not be needed. If the difference between the value of inuse and the value of committed exceeds a threshold, then it is profitable for the JVM to give back memory to the operating system.

If it is determined, at step 208, that a significant amount of committed heap memory can be returned to the operating system, processing continues to step 210. Otherwise, the computer system 102 continues monitoring, as step 204

The computer system 102 determines a new value for the parameter committed. This new value is stored in memory location new_committed. The value of new_committed is desired to be lower than the value of parameter committed, but not lower than the value of inuse. In general, the value of new_committed should be higher than the value of inuse to prevent the heap size from getting too small, which in the worst case could trigger an out-of-memory error. Next, the value of softmx is lowered to match the value of new_committed.

In order to instantiate the new lower value of softmx for the heap, a compacting garbage collection is performed, at step 212. This has the effect of lowering the value of committed to the current value of softmx (which is the same value as new_committed) and returning memory freed from the heap to the operating system.

It is risky to keep softmx low because it limits how much the heap can grow to. If the value of softmx is too low, an out-of-memory error can occur. Therefore, at step 214, the value of softmx is raised. For example, the value of softmx can be increased to its previous value. Thereafter, the computer system 102 returns to continuously monitoring for run-time performance information, at step 204.

There are a number of parameters which affect how aggressively the method depicted in FIG. 2 will be in lowering the value of softmx and returning memory from the heap to the operating system. These include but are not limited to the following:

The parameter(s) for detecting a low garbage collection activity. For example, suppose that the condition indicating low garbage collection activity is time since the last garbage collection exceeding a threshold. A threshold such as 5 seconds would be expected to return more memory to the operating system than a longer threshold such as 30 seconds.

The policy for determining in step 208 if a significant amount of memory can be released to the operating system. For example, a policy of lowering softmx whenever any memory can be released to the operating system (i.e. significant is any positive value) would be expected to release more memory to the operating system than a policy of only lowering softmx when 1 gigabyte or more of heap memory can be released to the operating system.

The value of new_committed. For example, setting new_committed as low as inuse would be expected to return more memory to the operating system than setting new_committed to inuse plus 700 megabytes. The risk of setting new_committed too low is that there may be an increased risk of an out-of-memory error if the application needs more heap memory.

Releasing memory to the operating system can incur some overhead (typically CPU overhead). Therefore, it is important to strike a balance and release some memory to the operating system but not so much that the overhead of releasing memory degrades performance.

The computer system 102, for example, has a number of pre-defined parameter settings for achieving different levels of aggressiveness in returning memory to the operating system. Users can pick different levels depending on how important it is to limit the heap memory used by the application. For example, the computer system 102 might be configured with the following numerical options, from 1 to 4 (for example). Users could pick any of these options for their applications:

Least Aggressive.

Don't make any attempt to return memory to the operating system by lowering softmx. A garbage collector might return heap memory to the operating system independently from an embodiment of the present disclosure.

Low Level of Reducing Heap Memory.

Set parameters to return some heap memory to the operating system but not too much. For example, garbage collection activity might need to drop to a relatively low level before the system attempts to lower softmx. In addition, softmx might not be lowered by much.

Moderate Level of Reducing Heap Memory.

For example, garbage collection activity might not need to drop off as much compared with the "Low level of reducing heap memory" option before the computer system 102 attempts to lower softmx. In addition, the value of softmx might be lowered more compared with the "Low level of reducing heap memory" option.

High Level of Reducing Memory.

For example, garbage collection activity might not need to drop off much before the system attempts to lower softmx. In addition, the system may try to lower softmx as much as possible without risking an out-of-memory error.

By providing options such as the ones above, the computer system 102 makes it easy for users to select an appropriate level for returning heap memory to the operating system. Note that a wide variety of other options for defining the extent to which heap memory is returned to the operating system can be specified within the scope of the present disclosure.

Figure 3:
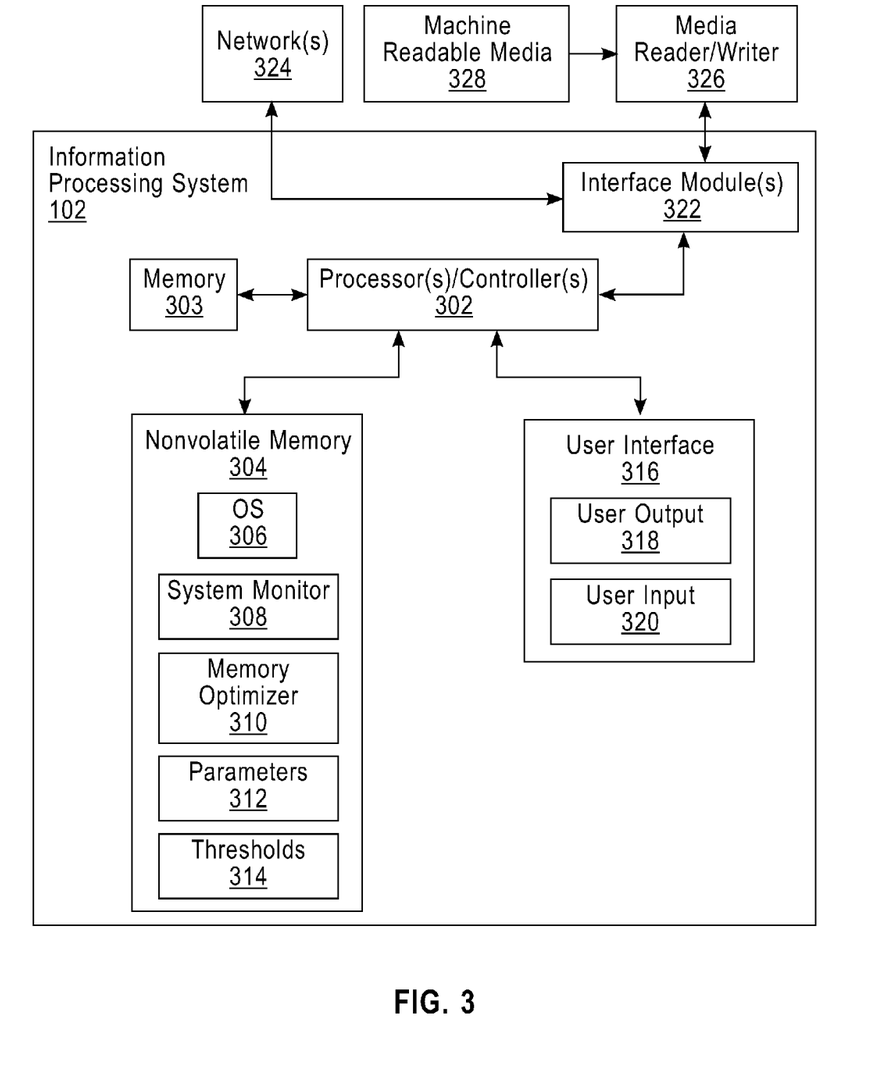
FIG. 3 is a block diagram illustrating a more detailed view of the example computer system operating environment of FIG. 1, according to various embodiments of the present disclosure.

FIG. 3 shows a more detailed view of an alternative embodiment of a computer system 102 such as illustrated in FIG. 1. The method of FIG. 2 will now be discussed with reference to the specific example computer system 102 shown in FIG. 3.

The flow diagram shown in FIG. 2 illustrates the architecture, functionality, and operation of possible implementations of systems, methods, and computer program products according to various embodiments herein. In this regard, each block in the flow diagram may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

With particular reference to the process of FIG. 2, the processor/controller 302 (see FIG. 3) enters the process, at step 202, and immediately proceeds to monitoring the computer system 102, at step 204. A system monitor 308 in the computer system 102, at step 204, interoperates with the processor/controller 302 and monitors the run-time performance of the computer system 102 and collects run-time performance information including, but not limited to, CPU usage, memory usage, and heap usage. The collected run-time performance information is stored and updated in nonvolatile memory 304, such as in the parameters memory 312. The system monitor 308, according to the present example, continuously monitors the run-time performance of the computer system 102 and collects run-time performance information.

The memory optimizer 310, at step 204, interoperates with the processor/controller 302 and continuously monitors the values of the parameters softmx, committed, and inuse, and other parameters, stored in the parameters memory 312. These values are maintained and continuously updated in the parameters memory 312 by the system monitor 308.

While the memory optimizer 310, at step 206, determines that garbage collection activity is not sufficiently low, the memory optimizer 310, at step 204, continuous to monitor the values of the parameters softmx, committed, and inuse, and other parameters, that are stored in the parameters memory 312. Also, the system monitor 308, at step 204, continuously monitors run-time performance of the computer system 102 and collects and stores the collected run-time performance information in the parameters memory 312. After the memory optimizer 310, at step 206, determines that garbage collection activity is low, the memory optimizer, at step 208, determines if significant amount of memory can be released to the operating system.

It should be noted that there are multiple ways in which the memory optimizer 310 can determine if garbage collection activity is sufficiently low, including but not limited to any one or a combination of the following:

1) Time since the last garbage collection has exceeded a threshold value 314 (i.e., in the current example the threshold values are stored in the thresholds 314 memory locations in the nonvolatile memory 304).

2) Frequency of last several garbage collections. It is preferable to weight frequencies of more recent garbage collections higher than less recent ones.

3) Time, and/or other overhead metric, spent in garbage collections. It is preferable to weight more recent garbage collections higher than less recent ones.

4) The memory optimizer 310 can optionally normalize garbage collection overhead. For example, any of the previous metrics can be normalized by the time spent by an application in regular processing, not including garbage collection, as monitored by the system monitor 308 in the computer system 102. For example, the memory optimizer 310 could determine if garbage collection activity is sufficiently low by dividing the frequency of garbage collections by the time spent by the application in regular processing, not including garbage collection.

The memory optimizer 310 can also consider garbage collections which compact memory (i.e. compacting garbage collections). Thus, the memory optimizer 310 can also determine if garbage collection is sufficiently low using any one or a combination of the following metrics:

1) Time since the last compacting garbage collection has exceeded a threshold value 314 (i.e., in the current example the threshold values are stored in the thresholds 314 memory locations in the nonvolatile memory 304).

2) Frequency of last several compacting garbage collections. It is preferable to weight frequencies of more recent garbage collections higher than less recent ones.

3) Time, and/or other overhead metric, spent in at least one compacting garbage collection. It is preferable to weight more recent garbage collections higher than less recent ones.

4) The memory optimizer 310 can optionally normalize garbage collection overhead for compacting garbage collections. For example, any of the previous metrics can be normalized by the time spent by an application in regular processing, not including garbage collection, as monitored by the system monitor 308 in the computer system 102. For example, the memory optimizer 310 could determine if garbage collection activity is sufficiently low by dividing the frequency of compacting garbage collections by the time spent by the application in regular processing, not including garbage collection.

Once the memory optimizer 310 determines that garbage collection activity is sufficiently low, it estimates how much heap memory could be released (e.g., returned to the operating system), at step 208. If the value of the parameter committed is determined to be below a threshold value 314, then the heap is not consuming much memory, so there isn't much point to trying to reduce the heap size further. If the memory optimizer 310, at step 208, determines that there is insignificant amount of memory available to be released, the operational sequence for the computer system 102 returns to continuously monitoring the computer system 102, at step 204.

If the value of the parameter committed is determined to be above the threshold value 314, at step 208, then the memory optimizer 310 does further tests to see how much heap memory could be returned to the operating system. The memory optimizer 310 has the option of invoking a garbage collector (i.e., in the present example, one or more garbage collectors are available in the operating system 306) to perform a compacting garbage collection to lower the value of the parameter inuse as much as possible. If the value of the parameter inuse is already low enough, this step may not be needed. If the difference between the value of the parameter inuse (in use heap memory) and the value of the parameter committed (committed heap memory) exceeds a threshold value 314, then the memory optimizer 310 determines that it is profitable for the JVM to give back memory to the operating system.

If memory optimizer 310 determines, at step 208, that a significant amount of committed heap memory can be returned to the operating system, the operational processing sequence continues, at step 210.

The memory optimizer 310, at step 210, determines a new value for the parameter committed, and stores the new value in the parameter new_committed. The value of the parameter new_committed must be lower than the value of the parameter committed, but not lower than the value of the parameter inuse. In general, the value of the parameter new_committed should be higher than the value of the parameter inuse to prevent the heap size from getting too small which in the worst case could trigger an out-of-memory error. Next, at step 210, the memory optimizer 310 lowers the value of the parameter softmx to match the value of the parameter new_committed.

In order to instantiate the new lower value of the value of the parameter softmx for the heap, the memory optimizer 310 invokes a garbage collector (i.e., in the present example, one or more garbage collectors are available in the operating system 306) to perform a compacting garbage collection, at step 212. This has the effect of lowering the value of the parameter committed to the current value of the parameter softmx (which is the value of the parameter new_committed) and returning memory freed from the heap to the operating system.

It is risky to keep the value of the parameter softmx low because it limits how much the heap can grow to. If the value of the parameter softmx is too low, an out-of-memory error can occur. Therefore, at step 214, the memory optimizer 310 increases the value of the parameter softmx. For example, the value of the parameter softmx can be increased to its previous value. The operational processing sequence then exits, at step 216.

There are a number of parameters which can affect how aggressively the method depicted, by example, in FIG. 2 will be in lowering the value of the parameter softmx and returning memory from the heap to the operating system. These include, but are not limited, to the following:

the parameter(s) for detecting a low garbage collection activity. For example, suppose that the condition indicating low garbage collection activity is determined to occur at a time since the last time that a garbage collection activity exceeding a threshold value 314 of activity was determined. A threshold value 314 such as 5 seconds would be expected to return more heap memory to the operating system than a longer time threshold value 314 such as 30 seconds.

the policy for determining if a significant amount of memory can be released to the operating system at step 204. For example, a policy of lowering the value of the parameter softmx whenever any memory can be released to the operating system (e.g., significant is any positive value) would be expected to release more memory to the operating system than a policy of only lowering the value of the parameter softmx when, for example, 1 gigabyte or more of heap memory can be released to the operating system.

the value of the parameter new_committed. For example, setting the value of the parameter new_committed as low as the value of the parameter inuse would be expected to return more memory to the operating system than setting the value of the parameter new_committed to the value of the parameter inuse plus 700 megabytes. The risk of setting the value of the parameter new_committed too low is that there may be an increased risk of an out-of-memory error if the application needs more heap memory.

Releasing memory to the operating system can incur some processing overhead (typically CPU overhead). Therefore, it is important to strike a balance and release some memory to the operating system while not releasing so much memory that the overhead of releasing memory degrades performance.

A computer system 102, according to various embodiments of the present disclosure, has a number of pre-defined parameter settings for achieving different levels of aggressiveness in returning memory to the operating system. Users can pick different levels depending on how important it is to limit the heap memory used by the application. Based on the level specified by the user the memory optimizer 310 can indicate to the JVM that it attempt to release memory to the operating system. For example, the computer system 102 might be configured with the following numerical options, from 1 to 4 (for example). Users could pick any of these options for their applications:

1) least aggressive. Don't make any attempt to return memory to the operating system by lowering the value of the parameter softmx. It should be noted that, according to certain computer system implementations, a garbage collector might return heap memory to the operating system independently from an embodiment of the present disclosure.

2) low level of reducing heap memory. Set parameters to return some heap memory to the operating system but not too much. For example, garbage collection activity might need to drop to a relatively low level before the computer operating system, or other processing system resource, attempts to lower the value of the parameter softmx. In addition, the value of the parameter softmx might not be lowered by much.

3) moderate level of reducing heap memory. For example, garbage collection activity might not need to drop off as much compared with the relatively low level of garbage collection activity as discussed for option 2) before the computer operating system, or other processing system resource, attempts to lower the value of the parameter softmx. In addition, the value of the parameter softmx might be lowered less compared with the value of the parameter softmx as discussed for option 2).

4) high level of reducing heap memory. For example, garbage collection activity might not need to drop off much before the computer operating system, or other processing system resource, attempts to lower the value of the parameter softmx. In addition, the computer operating system may try to lower the value of the parameter softmx as much as possible without risking an out-of-memory error.

By providing options such as the ones above, various embodiments of the present disclosure can make it easy for users to select an appropriate level for releasing (returning) heap memory to the operating system. Note that a wide variety of other options for defining the extent to which heap memory is returned to the operating system can be specified within the scope of the present disclosure.

FIG. 3 shows a more detailed view of the example computer system operating environment applicable to various embodiments of the present disclosure as shown in FIG. 1. In particular, FIG. 3 shows an information processing system (e.g., computer system) 102 that is based upon a suitably configured processing system adapted to implement one or more embodiments of the present disclosure. Similarly, any suitably configured processing system can be used as the information processing system 102 by various embodiments of the present disclosure. The information processing system 102 can be a standalone system or reside within a multi-system environment such as a parallel-distributing environment.

The information processing system (e.g., computer system) 102 includes at least one processor/controller 302. The at least one processor(s) 302 is communicatively coupled with a memory 303 and with a non-volatile memory 304. The non-volatile memory 304 can be used to store program, data, and configuration parameters, in persistent memory.

An operating system (OS) 306, according to the present example, is stored in the non-volatile memory 304 and can interoperate with the processor/controller 302 to provide OS operations in the information processing system 102. One or more memory management resources are provided by the OS 306. For example, one or more garbage collectors (not shown) can be provided in the OS 306 and made available to be invoked to perform garbage collection, or compacting garbage collection, for one or more heaps in the memory 303. Additionally, one or more timers (not shown) are provided in the OS 306 that can be used, for example, for keeping track of timed events in the information processing system 102. As one example, the time since the last garbage collection (or compacting garbage collection) can be monitored using the one or more timers (not shown) in the OS 306.

A system monitor 308, according to the present example, is stored in the non-volatile memory 304 and can interoperate with the processor/controller 302 to monitor run-time performance of the information processing system 102 and to collect run-time performance information including, but not limited to, CPU usage, memory usage, and heap usage. The collected run-time performance information is stored and updated in the non-volatile memory 304, such as in the parameters memory 312.

A memory optimizer 310, according to the present example, is stored in the non-volatile memory 304 and can interoperate with the processor/controller 302 to optimize memory management operations in the information processing system 102. Various of the operations performed with the memory optimizer 310 have been discussed above with reference to the operational processing sequence illustrated in FIG. 2.

The various parameters stored in the parameters memory 312 in the non-volatile memory 304, may include a set of thresholds 314 stored in the non-volatile memory 304. Each of the thresholds (also referred to as "threshold values") 314 stores a threshold value that can be monitored and updated by the at least one processor/controller 302.

The at least one processor/controller 302 is communicatively coupled with a user interface 316 which includes a user output interface 318 and a user input interface 320. The user interface 316 provides the user input interface 320 for receiving user input communication from a user of the information processing system 102. The user interface 316 provides the user output interface 318 for providing communication to a user of the information processing system 102

The user output interface 318 may include one or more display devices to display information to a user of the system 102. A display device (not shown) can include a monochrome or color Liquid Crystal Display (LCD), Organic Light Emitting Diode (OLED), or other suitable display technology for conveying image information (e.g., text, graphics, icons, etc.) to a user of the information processing system 102. A display device, according to certain embodiments, comprises a graphical user interface (GUI). A display device can include, according to certain embodiments, touch screen technology, e.g., a touchscreen display, which also serves as a user input interface 320 for detecting user input (e.g., touch of a user's finger or of a stylus). One or more speakers in the user output interface 318 can provide audible information to the user, and one or more indicators can provide indication of certain conditions of the computer system 102 to the user. The indicators can be visible, audible, or tactile, thereby providing necessary indication information to the user of the information processing system 102.

The user input interface 320 may include one or more keyboards, keypads, mouse input device, track pad, and other similar user input devices. A microphone is included in the user input interface 320, according to various embodiments, as an audio input device that can receive audible signals from a user. The audible signals can be digitized and processed by audio processing circuits and coupled to the processor/controller 302 for voice recognition applications such as for the information processing system 102 to receive data and commands as user input from a user One or more input/output interface modules 322 are communicatively coupled with the processor/controller 302. In this way, the information processing system 102 is able to communicate with other processing systems and devices. For example, the processor/controller 302 is communicatively coupled with interface module(s) 322 that communicatively couple the information processing system 102 with external networks 324 and with a media reader/writer 326. The external networks 324 can include any one or a combination of wired, wireless, local area, and wide area networks.

The media reader/writer 326 can interoperate with the processor/controller 302 to read and write machine (computer) readable media 328 that may be communicatively coupled with the media reader/writer 326. Computer readable media 328, which in the present example comprise a form of computer readable storage medium, may be coupled with the media reader/writer 326 to provide information via the interface module(s) 322 to-from the processor/controller 302 of the information processing system 102. For example, data, configuration parameters, and instructions for the processor/controller 302 may be provided via the computer readable media 328 to the information processing system 102.

The interface module(s) 322 can also connect, for example, mass storage devices to the information processing system 102. One specific type of data storage device is an optical drive such as a CD/DVD drive, which may be used to store data to and read data from a computer readable storage medium such as, but not limited to, a CD/DVD device. Another type of data storage device is a data storage device configured to support, for example, NTFS type file system operations.

Although only one CPU (processor/controller) 302 is illustrated for computer system 102, computer systems with multiple CPUs (processors/controllers) 302 can be used equally effectively. Various embodiments of the present disclosure further incorporate interfaces that each includes separate, fully programmed processors that are used to off-load processing from the CPU 302.

An operating system 306 included in the nonvolatile memory 304 is a suitable multitasking operating system such as any of the operating systems Linux, UNIX, Windows, and Windows Server based operating systems, which optionally may also comprise a multi-processing operating system. Various embodiments of the present disclosure are able to use any other suitable operating system. Some embodiments of the present disclosure utilize architectures, such as an object oriented framework mechanism, that allows instructions of the components of operating system to be executed on any processor/controller 302 located within the information processing system 102. Various embodiments of the present disclosure are able to be adapted to work with any data communications connections including present day analog and/or digital techniques or via a future networking mechanism.

As will be appreciated by one of ordinary skill in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects, that may each generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or alternatively a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, solid-state memory, a memory card or other package that houses one or more memories, a random access memory (RAM), other re-writable (volatile) memories, a read-only memory (ROM), an erasable programmable read-only memory (EPROM or Flash memory), an optical fiber, a portable compact disc read-only memory (CD-ROM), an optical storage device, a magnetic storage device, a magneto-optical medium such as a disk or tape, other tangible media which can be used to store information, or any suitable combination of the foregoing. In the context of this document, a computer readable storage medium may be any tangible medium (i.e., any computer readable medium that is not a computer readable signal medium) and that can embody, contain, and/or store, a program for use by or in connection with an instruction execution processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution processing system, apparatus, or device. Program code embodied on a computer readable signal medium may be transmitted using any appropriate medium, including but not limited to wireless, wireline, optical fiber cable, RF, microwave, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present disclosure are described with reference to flowchart illustrations and/or block diagrams of methods, apparatus (systems) and computer program products according to various embodiments of the disclosure. It will be understood that one or more blocks of the flowchart illustrations and/or block diagrams, and combinations of blocks in the flowchart illustrations and/or block diagrams, can be implemented by computer program instructions. These computer program instructions may be provided to one or more processors, to a special purpose computer, or to other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. Instructions stored in a computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with various embodiments, methods described herein are intended for operation as software programs running on a computer processor. Furthermore, software implementations can include, but are not limited to, distributed processing or component/object distributed processing, parallel processing, or virtual machine processing and can also be constructed to implement the methods described herein.

The terms program, software application, application, and the like, as used herein, are defined as one or more sequences of instructions designed for execution on a processing system. A program, computer program, application, or software application, may include a subroutine, a function, a procedure, an object method, an object implementation, an executable application, an applet, a servlet, a source code, an object code, a shared library/dynamic load library and/or other sequence of instructions designed for execution on a processing system.

While the computer readable media 328 is shown in the current example embodiment as a single computer readable storage medium, the term "computer readable storage medium" should be taken to include a single medium or multiple media (e.g., a centralized or distributed database, and/or associated caches and servers) that store the one or more sets of instructions. The term "computer-readable storage medium" shall include any non-transitory medium that is capable of storing or encoding a set of instructions for execution by the machine and that cause the machine to perform any one or more of the methods of the subject disclosure.

Although the present specification may describe components and functions implemented in the embodiments with reference to particular standards and protocols, the disclosure is not limited to such standards and protocols. Each of the standards represent examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Plural and singular terms are the same unless expressly stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The terms "heap" or "heap memory" are intended to broadly refer to the memory area managed using garbage collection and is not specific to the Java programming language or specific to any other programming language. The term "run-time system" in the context of the present disclosure is intended to broadly refer to a run-time operating environment or platform for executing a compatible application thereon, and which executes the application on a processing system. Optionally, the run-time system executes the application in coordination with an operating system on a processing system. The application may, but not necessarily, include the run-time system. For example, and not for limitation, a Java application may execute on a Java Virtual Machine run-time system.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the disclosure presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. In a processing system including an application, a run-time system, and a heap memory used by the application, wherein unused memory in the heap memory is reclaimed by a garbage collector, a method for reducing memory used by the application comprising:
   periodically monitoring, with the processing system, information related to the application's memory usage including a maximum heap memory size, a committed heap memory size, an in use heap memory size, and a garbage collection activity level;
   based on determining that the garbage collection activity level is below a first threshold, estimating an amount of memory that can be released from the application by reducing the maximum heap memory size; and
   based on determining that the estimated amount of memory that can be released from the application is above a second threshold, attempting to release memory from the application by reducing the maximum heap memory size to a value lower than the committed heap memory size, but not lower than the in use heap memory size.

2. The method of claim 1 in which the estimating an amount of memory that can be released from the application by reducing the maximum heap memory size comprises:
   determining a difference between the committed heap memory size and the in use heap memory size.

3. The method of claim 1 in which the estimating an amount of memory that can be released from the application by reducing the maximum heap memory size comprises:
   performing a compacting garbage collection; and
   determining a difference between the committed heap memory size and the in use heap memory size.

4. The method of claim 1 in which the reducing the maximum heap memory size to a value lower than the committed heap memory size comprises:
   performing a compacting garbage collection to instantiate the reduced value of maximum heap memory size.

5. The method of claim 1 further comprising:
   increasing the maximum heap memory size to allow the application to allocate more heap memory.

6. The method of claim 1 in which the application comprises a Java virtual machine.

7. The method of claim 1 in which the garbage collection activity level is determined based on at least one of:
   a time since a garbage collection was performed on the heap memory;
   a frequency of garbage collection performed on the heap memory; and
   a time spent in garbage collection performed on the heap memory.

8. The method of claim 1 in which the garbage collection activity level is determined based on at least one of:
   a time since a compacting garbage collection was performed on the heap memory,
   a frequency of compacting garbage collection performed on the heap memory, and
   a time spent in at least one compacting garbage collection performed on the heap memory.

9. The method of claim 1 in which the monitored garbage collection activity level is determined by normalizing a metric representing garbage collection overhead by an amount of processing time spent by the application not including garbage collection.

10. The method of claim 1, further comprising:
    providing a plurality of options to a user for specifying a level at which the processing system attempts to reduce memory used by the application.

11. An information processing system comprising:
    a memory;
    a processor communicatively coupled to the memory;
    a garbage collector communicatively coupled to the processor and the memory;
    a system monitor communicatively coupled to the processor and the memory;
    a memory optimizer communicatively coupled to the processor and the memory, wherein an application running on the information processing system is communicatively coupled with a run-time system and a heap memory portion of the memory, wherein unused memory in the heap memory is reclaimed by the garbage collector, and further wherein the system monitor monitors run-time performance information for the run-time system and the heap memory and maintains memory usage parameters for the application including a maximum heap memory size, a committed heap memory size, and an in use heap memory size, and wherein the processor, responsive to executing computer instructions, performs operations comprising:

maintaining, with the system monitor, memory usage parameters for the application including a maximum heap memory size, a committed heap memory size, and an in use heap memory size;

reducing, with the memory optimizer, the maximum heap memory size to a value lower than the committed heap memory size but not lower than the in use heap memory size;

performing, with the garbage collector, a compacting garbage collection on the heap memory to instantiate the reduced value of the maximum heap memory size; and increasing, with the memory optimizer, the maximum heap memory size to allow the application to allocate more heap memory.

12. The information processing system of claim 11, wherein the processor, responsive to executing the computer instructions, performs operations comprising:

periodically monitoring, with the system monitor, run-time performance information related to the memory usage of the application, including a maximum heap memory size, a committed heap memory size, an in use heap memory size, and a garbage collection activity level;

based on determining, with the processor, that the monitored garbage collection activity level is below a first threshold, estimating, with the memory optimizer, an amount of memory that can be released from the application by reducing the maximum heap memory size; and based on determining that the estimated amount of memory that can be released from the application is above a second threshold and that the monitored garbage collection activity level is below the first threshold, reducing the maximum heap memory size to a value lower than the monitored committed heap memory size, but not lower than the monitored in use heap memory size, and thereby releasing memory from the application.

13. The information processing system of claim 12, wherein the estimating comprises determining, with the memory optimizer, a difference between the committed heap memory size and the in use heap memory size.

14. The information processing system of claim 12, wherein the estimating comprises performing, with the garbage collector, a compacting garbage collection on the heap memory; and determining, with the memory optimizer, a difference between the committed heap memory size and the in use heap memory size.

15. The information processing system of claim 12, wherein the reducing the maximum heap memory size to a value lower than the monitored committed heap memory size comprises:

performing, with the garbage collector, a compacting garbage collection to instantiate the reduced value of maximum heap memory size.

16. A computer readable storage medium, comprising computer instructions which, responsive to being executed by a processor, the processor being in an information processing system comprised of at least one application including a run-time system and a heap memory wherein unused memory in the heap memory is reclaimed by a garbage collector, the computer instructions cause the processor to perform operations comprising:

periodically monitoring the application for memory usage including a maximum heap memory size, a committed heap memory size, an in use heap memory size, and a garbage collection activity level; and in response to the garbage collection activity level falling below a threshold value, attempting to release memory from the application by reducing the maximum heap memory size to a value lower than the committed heap memory size but not lower than the in use heap memory size.

17. The computer readable storage medium of claim 16, wherein the application is a Java application comprising a Java virtual machine.

18. The computer readable storage medium of claim 16, comprising computer instructions which, responsive to being executed by the processor, cause the processor to perform operations comprising:

increasing the maximum heap memory size to allow the application to allocate more heap memory.

19. The computer readable storage medium of claim 16, comprising computer instructions which, responsive to being executed by the processor, cause the processor to perform operations comprising:

performing a compacting garbage collection to instantiate the reduced value of maximum heap memory size.

20. The computer readable storage medium of claim 16, wherein the garbage collection activity is determined based on at least one of:

a time since garbage collection was performed on the heap memory;

a frequency of garbage collection performed on the heap memory; and a time spent in garbage collection performed on the heap memory.

21. In a system comprised of an application including a run-time system and a heap memory wherein unused memory in the heap memory is reclaimed by a garbage collector, a method for reducing memory used by the application comprising the steps of:

maintaining memory usage parameters for the application including a maximum heap memory size, a committed heap memory size, and an inuse heap memory size;

reducing the maximum heap memory size to a value lower than the committed heap memory size but not lower than the inuse heap memory size;

performing a compacting garbage collection to instantiate the reduced value of maximum heap memory size; and increasing the maximum heap memory size to allow the application to allocate more heap memory.

22. In a system comprised of an application including a run-time system and a heap memory wherein unused memory in the heap memory is reclaimed by a garbage collector, a method for reducing memory used by the application comprising the steps of:

periodically monitoring said application for memory usage including a maximum heap memory size, a committed heap memory size, an inuse heap memory size, and a garbage collection activity level; and in response to said garbage collection activity level falling below a threshold, attempting to release memory from the application by reducing said maximum heap memory size to a value lower than the committed heap memory size but not lower than the inuse heap memory size.

* * * * *